United States Patent
Inamdar et al.

(10) Patent No.: US 12,081,626 B2
(45) Date of Patent: Sep. 3, 2024

(54) METHODS FOR SEAMLESS SESSION TRANSFER WITHOUT RE-KEYING

(71) Applicant: Cisco Technology, Inc., San Jose, CA (US)

(72) Inventors: Kaustubh Inamdar, Bangalore (IN); Vinay Saini, Bangalore (IN); Ankush Ganpatrai Arora, Maharashtra (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/188,934

(22) Filed: Mar. 23, 2023

(65) Prior Publication Data

US 2023/0254698 A1    Aug. 10, 2023

Related U.S. Application Data

(62) Division of application No. 17/171,700, filed on Feb. 9, 2021, now Pat. No. 11,683,380.

(51) Int. Cl.
*G06F 15/16* (2006.01)
*H04H 60/23* (2008.01)
(Continued)

(52) U.S. Cl.
CPC ........... *H04L 67/148* (2013.01); *H04H 60/23* (2013.01); *H04L 9/0819* (2013.01); *H04L 9/14* (2013.01);
(Continued)

(58) Field of Classification Search
CPC .... H04W 12/63; H04W 12/50; H04L 9/0819; H04L 9/14
See application file for complete search history.

(56) References Cited

U.S. PATENT DOCUMENTS 7,003,086 B1    2/2006    Shaffer et al.
8,738,699 B2    5/2014    Hovdal et al.
(Continued)

FOREIGN PATENT DOCUMENTS

CN    111246152    6/2020
EP    2739112 A1    4/2014
(Continued)

OTHER PUBLICATIONS

Aatifah Noureen, et al, "Secure Device Pairing Methods: An Overview", (IJACSA) International Journal of Advanced Computer Science and Applications, vol. 8, No. 9, Sep. 2017, 10 pages.
(Continued)

*Primary Examiner* — Joseph R Maniwang
(74) *Attorney, Agent, or Firm* — Edell, Shapiro & Finnan, LLC

(57) ABSTRACT

A method for a seamless transfer of a secure multimedia conference session from one endpoint device to another without a need to rekey the session is provided. In this method, a first endpoint device connects a participant to a multimedia conference session to which at least one other participant is connected and based on detecting one or more second endpoint devices within a predetermined location proximity of the first endpoint device, determines whether to transfer the multimedia conference session to a target endpoint device. Based on determining that the session is to be transferred, the first endpoint device establishes a secure pairing connection directly with the target endpoint device and provides, via the secure pairing connection, information about the multimedia conference session based on which the multimedia conference session is transferred to the target endpoint device without rekeying the multimedia conference session.

20 Claims, 8 Drawing Sheets

(51) Int. Cl.
    *H04L 9/08* (2006.01)
    *H04L 9/14* (2006.01)
    *H04L 9/40* (2022.01)
    *H04L 12/18* (2006.01)
    *H04L 67/141* (2022.01)
    *H04L 67/147* (2022.01)
    *H04L 67/148* (2022.01)
    *H04W 12/50* (2021.01)
    *H04W 12/63* (2021.01)

(52) U.S. Cl.
    CPC ...... *H04L 12/1813* (2013.01); *H04L 63/0442* (2013.01); *H04L 63/102* (2013.01); *H04L 67/141* (2013.01); *H04L 67/147* (2013.01); *H04W 12/50* (2021.01); *H04W 12/63* (2021.01)

(56) References Cited

U.S. PATENT DOCUMENTS

| | | | |
|---|---|---|---|
| 8,830,295 | B2 | 9/2014 | Vivekanandan et al. |
| 10,178,350 | B2 | 1/2019 | Mueller et al. |
| 10,440,073 | B2 | 10/2019 | Kristiansen et al. |
| 10,855,440 | B1 | 12/2020 | Alwen et al. |
| 2002/0025798 | A1 | 2/2002 | Titmuss et al. |
| 2006/0026288 | A1 | 2/2006 | Acharya et al. |
| 2006/0251256 | A1 | 11/2006 | Asokan et al. |
| 2006/0282774 | A1 | 12/2006 | Covell et al. |
| 2008/0160977 | A1 | 7/2008 | Ahmaniemi et al. |
| 2008/0175190 | A1 | 7/2008 | Lee et al. |
| 2011/0014929 | A1 | 1/2011 | Moshfeghi et al. |
| 2011/0055567 | A1 | 3/2011 | Sundaram et al. |
| 2011/0153782 | A1 | 6/2011 | Zhao |
| 2011/0211700 | A1 | 9/2011 | Park et al. |
| 2012/0185291 | A1 | 7/2012 | Ramaswamy et al. |
| 2013/0290494 | A1 | 10/2013 | Goudarzi et al. |
| 2013/0317874 | A1 | 11/2013 | Kozloski et al. |
| 2014/0122730 | A1 | 5/2014 | Burch et al. |
| 2014/0359709 | A1* | 12/2014 | Nassar ................. H04L 65/403 726/4 |
| 2015/0349971 | A1 | 12/2015 | Sinha et al. |
| 2015/0365133 | A1 | 12/2015 | Viverette et al. |
| 2016/0105472 | A1* | 4/2016 | Chitroda ............ H04L 65/1094 709/204 |
| 2016/0277927 | A1 | 9/2016 | Lee et al. |
| 2017/0126645 | A1 | 5/2017 | Froelicher et al. |
| 2017/0134357 | A1 | 5/2017 | Ohlsson |
| 2017/0215011 | A1 | 7/2017 | Goldstein |
| 2020/0052891 | A1 | 2/2020 | Krenn et al. |
| 2020/0259640 | A1 | 8/2020 | Leavy et al. |
| 2020/0342083 | A1 | 10/2020 | Goldstein et al. |
| 2021/0006394 | A1 | 1/2021 | Tijink |
| 2021/0152529 | A1 | 5/2021 | Ruppin et al. |
| 2021/0255886 | A1 | 8/2021 | Niederhausern et al. |

FOREIGN PATENT DOCUMENTS

| | | |
|---|---|---|
| JP | 2006238386 | 9/2006 |
| JP | 2017175283 | 9/2017 |
| JP | 2020123790 | 8/2020 |

OTHER PUBLICATIONS

C. Jennings et al., "Encrypted Key Transport for DTLS and Secure RTP", Network Working Group, Jun. 23, 2020, 25 pages.

Cullen Jennings, "PERC Crypto Explained," Vimeo, 7 pages, Apr. 2017, https://vimeo.com/cullenfluffyjennings.

Agouaillard, "Secure Frames (SFrames): end-to-end media encryption with #webrtc now in chrome", WebRTC by Dr Alex, Mar. 30, 2020, 22 pages.

Nils Ohlmeier, "Privacy Enhanced Conferencing—II RTC Conference 2016", Youtube, Nov. 8, 2016, 2 pages, https://www.youtube.com/watch?v=d8-9AkhQeQU.

D. McGrew, et al., "Datagram Transport Layer Security (DTLS) Extension to Establish Keys for the Secure Real-time Transport Protocol (SRTP)", Internet Engineering Task Force (IETF), May 2010, 26 pages.

* cited by examiner

US 12,081,626 B2

METHODS FOR SEAMLESS SESSION TRANSFER WITHOUT RE-KEYING

PRIORITY CLAIM

This application is a divisional application of U.S. patent application Ser. No. 17/171,700, filed Feb. 9, 2021, the entirety of which is incorporated herein by reference.

TECHNICAL FIELD

The present disclosure generally relates to meeting space environments, and more particularly, to transferring a meeting session from one user device to another user device.

BACKGROUND

Online meetings or conferences have become quite popular for business and other uses. Often, participants attend these meetings on-the-go. As an example, an online meeting is started while a meeting participant is at home and using a laptop to participate in the meeting, then the meeting participant needs to continue the meeting from a vehicle, and subsequently then the meeting participant needs to continue the meeting in the office on another endpoint device. This is a common scenario for meetings that are scheduled during the time a participant may be commuting to the office. In these scenarios, online meetings need to be transferred from one endpoint device to another on-the-fly.

DESCRIPTION OF EXAMPLE EMBODIMENTS

Overview

Figure 1:
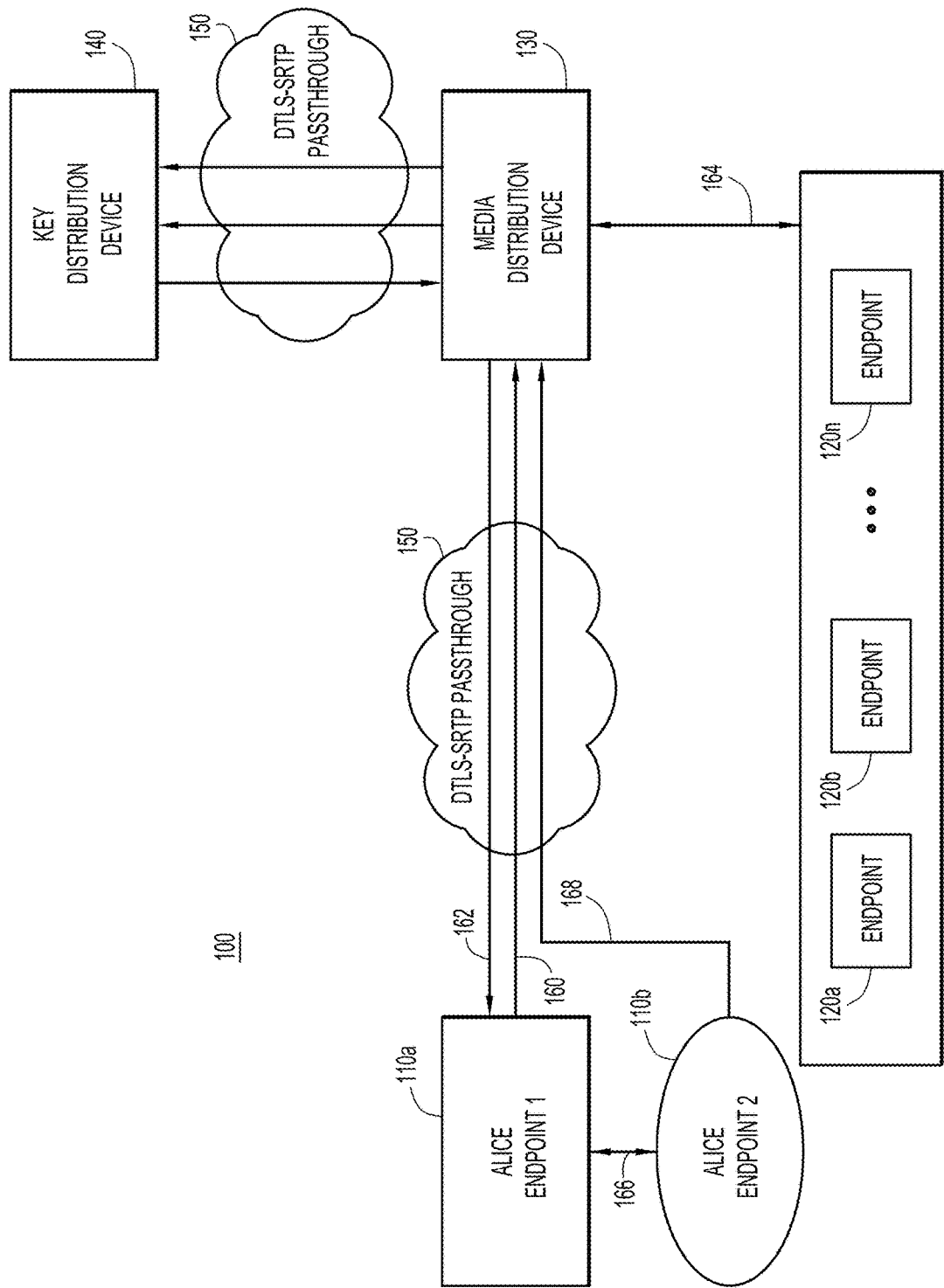
FIG. 1 is a block diagram illustrating a system in which a multimedia conference session is transferred for a meeting participant from a first endpoint device to a second endpoint device, according to an example embodiment.

Briefly, techniques are provided that support seamless transition of a conference session from a first endpoint device (to which conference session the first endpoint device is connected) to a second endpoint device without a need to rekey the conference session. These techniques facilitate the transition of the secure conference session by using short-range communication technologies to transfer the context of the conference session, including its security related information, from the first endpoint device to the second endpoint device.

In the systems and methods presented herein, a first endpoint device connects, on behalf of a participant, to a multimedia conference session to which at least one other participant is participating. Based on detecting one or more second endpoint devices within a predetermined location proximity of the first endpoint device, the first endpoint device determines whether to transfer the multimedia conference session to a target endpoint device from among the one or more second endpoint devices. Based on determining that the multimedia conference session is to be transferred to the target endpoint device, the first endpoint device establishes a secure pairing connection directly with the target endpoint device and provides, via the secure pairing connection, to the target endpoint device, information about the multimedia conference session. Using this information, a role of the first endpoint device in the multimedia conference session is transferred from the first endpoint device to the target endpoint device without rekeying the multimedia conference session.

Additionally, according to the techniques presented herein, a key distribution device obtains information about a first endpoint device that is to connect, on behalf of a participant, to a multimedia conference session that has at least one other participant are participating. The information indicates that the first endpoint device supports roaming of the multimedia conference session. The key distribution device further provides, to the first endpoint device, encryption information for encrypting content and controls for the multimedia conference session and a universally unique identifier that is associated with the first endpoint device. The universally unique identifier and the encryption information has been transferred from the first endpoint device to a second endpoint device via a secure proximity pairing connection. The key distribution device further obtains, from the second endpoint device, the universally unique identifier and information indicating that the multimedia conference session is transferred to the second endpoint device and associates the second endpoint device with the universally unique identifier such that the multimedia conference session for the participant is transferred to the second endpoint device without rekeying the multimedia conference session.

Example Embodiments

In today's environment, participants conduct meetings virtually. A virtual meeting, also called a multimedia conference session herein, involves real-time communication over a data channel. The virtual meeting is established as a session between endpoint devices associated with at least two participants. The endpoint devices of the participants connect to a meeting server that supports the multimedia conference session, i.e., online meeting, a video conference, and/or a collaboration session. Participants and/or users (these terms are also used interchangeably throughout the description) are participating in the multimedia conference session via their respective devices that may be geographically remote from each other. The participant and the respective user (client) device, such as a computer, laptop, tablet, smart phone, etc. may collectively be referred to as endpoints or endpoint devices. The endpoints may communicate with a meeting server that supports the multimedia conference session via one or more networks such as the Internet.

In a multimedia conference session, participants may view video of each other, share data, documents and other content, in addition to conducting audio communication with each other. Since at least some of the shared content may be sensitive, private, and/or confidential, a session is conducted securely. For example, a secure session is established using end-to-end encryption and authentication. There are various techniques for end-to-end encryption and authentication. Example embodiments refer to use of Privacy Enhanced Real Time Protocol Conference (PERC) technology, though this is only one example and the techniques are not limited thereto, and may encompass other encryption and authentication methods known in the art or later developed.

PERC relies on Data Transport Layer Security (DTLS) where a shared master secret is created as the result of a handshake. Keying material for a conference session or for a certain duration of the conference session is then derived from that master secret. In some conference sessions, a Secure Real-Time Protocol (SRTP) double encryption may be used. SRTP double encryption provides two levels of encryption: (1) outer encryption and (2) inner encryption. The outer encryption is used to encrypt data exchanged from an endpoint to a media distribution device. The outer encryption serves as a mechanism that protects the packet from any entity not supposed to be a part of the secure session. The outer encryption also ensures that the media distribution device is only able to look into very specific portions of the media packets. The inner encryption is used to encrypt data from one endpoint to other endpoints. The inner encryption ensures that only other endpoints in the meeting, that are considered to be fully trusted, can decode the contents of the media packets, namely video frames and audio payloads.

Additionally, a conference session may need to be conducted on-the-go, that is, where one or more participants may travel from one location to another but still maintain connectivity to the conference session. In this case, the ongoing or active session may need to be transferred from one endpoint device to another endpoint device on behalf of a particular participant. Techniques presented herein facilitate a secure transfer of a multimedia conference session on-demand to a new endpoint device without needing to rekey any of the endpoint devices that are connected to the multimedia conference session. The seamless and secure transfer of an active multimedia conference session is performed using a secure proximity pairing between a first endpoint device (a source endpoint device) and a second endpoint device (a target endpoint device). The transfer is simple because the context of the active session, including multimedia conference session state information and encryption keys, is transferred to the second endpoint device via a secure proximity pairing. As such, there is no need to rekey any of the endpoint devices participating in the active session. Further, the transfer occurs without generating overhead and delay associated with connecting a new endpoint device to the multimedia conference session. In other words, there is no delay of tearing down the connection with the first endpoint device and establishing a new connection with the second endpoint device.

FIG. 1 is a block diagram illustrating a system 100 in which a multimedia conference session may be transferred, on behalf of a participant, from a first endpoint device to a second endpoint device, according to an example embodiment. system 100 includes a first endpoint 110a and a second endpoint 110b associated with a first participant "Alice" in a multimedia conference session, other endpoints 120a-n of other participants in the multimedia conference session, a media distribution device 130 (e.g., meeting or conference server), and a key distribution device 140. The notation "a-n" denotes that a number is not limited, can vary widely, and depends on a particular use case scenario.

The first endpoint 110a, the second endpoint 110b, and other endpoints 120a-n are user (client) devices, explained above. These endpoint devices execute one or more services (applications or platforms) that provide for establishing and communicating in a multimedia conference session.

A media distribution device 130 is responsible for switching media. The media distribution device 130 is privy to all data exchanged in the multimedia conference session. The media distribution device 130 stores identifiers of various multimedia conference sessions and is responsible for distributing media (audio, video and other data) to various participants in a respective multimedia conference session. For security purposes and to avoid data leakage, the media distribution device 130 may not have decryption capability with respect to the media payloads. The media distribution device 130 may control storing and retrieval of content of the respective multimedia conference session but may not be able to access the unencrypted content. That is, the media distribution device 130 communicates the retrieved content in its encrypted form to a requesting endpoint device from among the other endpoint devices. The requesting endpoint device decrypts the received data and encrypts data prior to communicating, via the media distribution device 130, with another endpoint device(s) in the session.

Because the media distribution device 130 may be under the control of a third party (i.e., a service provider or organization other than the organization to which one or more of the participants belongs), a key distribution device (e.g., key management server) 140 provides a key management function for the user devices to ensure that the data is transmitted securely. The keys are provided so that data is sent using secure protocols. For example, the user devices may send data using SRTP whereas the keying material is derived using DTLS SRTP. Accordingly, a header portion of the data packets may be encrypted using hop-by-hop keys derived from a DTLS handshake while a payload portion of the data packets may be encrypted using end-to-end keys. These keys are provided and managed by key distribution device 140.

The endpoints 110a, 110b, and 120a-120n, the media distribution device 130, and the key distribution device 140 are configured to communicate with and/or through one or more network(s) 150. Examples of types of networks that can be utilized within the system 100 depicted in FIG. 1 include, without limitation, any one or more of local area networks (LANs), wide area networks (WANs), metropolitan area networks (MANs), telephone networks (e.g., public switched telephone networks), wireless local or wireless wide area (cellular) networks, etc., and/or any suitable combinations thereof.

According to some example embodiments, the multimedia conference session may be a PERC session and the key distribution device 140 provides keying services for the PERC session.

In FIG. 1, the first participant Alice wants to connect, via the first endpoint 110*a*, to a multimedia conference session to which other participants are connected using endpoints 120*a-n*. At 160, the first endpoint 110*a* establishes a DTLS association with the key distribution device 140 such that DTLS messages are tunneled transparently to and from the media distribution device 130. On establishment of the DTLS association, at 162, the first endpoint 110*a* obtains, from the key distribution device 140, encryption information that includes one or more of the following keys:

1. The Secure Real-Time Protocol (SRTP) Master Key from which media encryption keys are derived for securing and integrity protecting RTP packets.
2. The SRTP master salt used in a key derivation process at the first endpoint 110*a*.
3. The Key Encryption Key (KEK) with which endpoints in the conference session communicate security sensitive information using procedures of Encrypted Key Transport. The security sensitive information may include, but is not limited to, the SRTP master key, Roll Over Counter (ROC), and Synchronized Source (SSRC) of a sender.
4. The Hop-By-Hop (HBH) Key with which an outer cryptographic transform is created for SRTP packets.

Based on obtaining this encryption information, the first endpoint 110*a* is ready to encrypt packets for communicating in the multimedia conference session. For example, for the "inner" encryption, the key derived from the SRTP master key is used and, for the "outer" encryption, the HBH key between the first endpoint 110*a* and the media distribution device 130 is used.

Additionally, when the multimedia conference session is established or when the first participant "Alice" joins the session, at 164, packets from the first endpoint 110*a* and the other endpoints 120*a-n* have a Full Encryption Key Transport (EKT) tag. Based on the EKT tag, the first endpoint 110*a* and the other endpoints 120*a-n* discern SRTP keys for every other endpoint in the session.

In an active multimedia conference session, Alice may decide to transfer the session to a second endpoint 110*b* associated with Alice, such as to a mobile device, because Alice needs to leave the office. Based on Alice's input, the first endpoint 110*a* may scan for other endpoint devices in close physical proximity to the first endpoint 110*a*. As an alternative, the first endpoint 110*a* may periodically scan for nearby endpoints, and list of nearby endpoints is displayed on the first endpoint 110*a* to Alice. Based on a user selection of the second endpoint 110*b* from the displayed list of nearby endpoints, at 166, a secure pairing connection is established between the first endpoint 110*a* and the second endpoint 110*b* to transfer information about the ongoing multimedia conference session, as described below with reference to FIG. 2, to enable Alice to continue participating in the multimedia conference session from the second endpoint 110*b*.

At 168, the second endpoint 110*b* informs the key distribution device 140 via the media distribution device 130 that it took over the multimedia conference session for the first participant, Alice. Accordingly, the multimedia conference session is seamlessly transferred from the first endpoint 110*a* (source) to a second endpoint 110*b* (target) securely and with a complete media security context.

Figure 2:
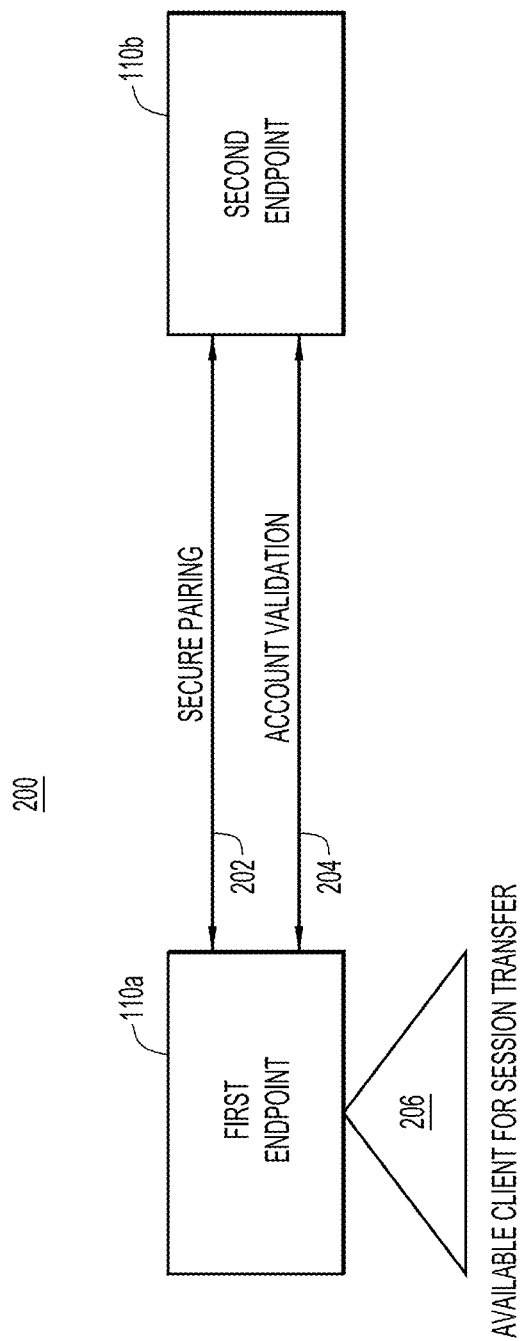
FIG. 2 is a sequence diagram illustrating a method of establishing a secure pairing between the first endpoint device and the second endpoint device for transferring information about a multimedia conference session, according to an example embodiment.

FIG. 2 is a sequence diagram illustrating a method 200 of establishing a secure pairing between the first endpoint 110*a* and the second endpoint 110*b* of FIG. 1 in order to transfer information about a multimedia conference session, according to an example embodiment.

For security reasons, session transfer is allowed only with those endpoints that are in close proximity to each other. Detection of other endpoints in close physical proximity may be achieved using various technologies such as Bluetooth® wireless technology or ultrasound techniques. Any short-range communication technology now known or hereinafter developed may be used for this secure pairing mechanism between endpoints, including Wi-Fi® wireless local area network technology, Near Field Communication (NFC) technologies, etc. This ensures that both endpoints are in close proximity to the participant for any session transfers to occur. These endpoints may include, without limitation, one or more meeting software applications installed theocon and/or dedicated meeting hardware.

Specifically, at 202, based on detecting physical proximity of the second endpoint 110*b* (and user selection of the second endpoint 110*b* to be used as a target endpoint device for conference session transfer), a secure pairing connection is established between the first endpoint 110*a* and the second endpoint 110*b*. A secure pairing connection may be established using various mechanisms. For example, an out of band (OOB) channel may be used to check credibility of the wireless connection such as acoustic, visual, or even tactile senses. As another example, the first endpoint 110*a* may send a pairing request to the second endpoint 110*b*, receive a pairing response, and establish a short term key to be used for encrypting secret keys that are to be exchanged between the two endpoints for the secure pairing.

As another example, each endpoint (the first endpoint 110*a* and the second endpoint 110*b*) associated with a participant (Alice) is provided with an encryption key pair. To establish the secure pairing, each of the first endpoint 110*a* and the second endpoint 110*b* generates a Diffie-Hellman key pair without interaction. This is possible as both endpoints 110*a* and 110*b* share the same master public and private keys. Additionally, these points may be pre-configured to agree on the Diffie-Hellman group and prime generator function. Both endpoints 110*a* and 110*b* then generate a shared secret that functions as a symmetric key for information exchange between them. The information may then encrypted in a Java Script Object Notation (JSON) format e.g., Local SSRC: "123ABC56", Roll Over Counter: "1", and so on.

In response to the secure pairing, at 204, the first endpoint 110*a* performs account validation to ensure that the second endpoint 110*b* is configured, and available, to conduct the multimedia conference session and is authorized for the transfer.

In one example embodiment, the participant may register, in advance, a set of endpoint devices to be used for a multimedia conference session. In this case, the first endpoint 110*a* checks whether the second endpoint 110*b* is one of the registered devices associated with the participant. If the second endpoint 110*b* is one of the endpoints on the list, the account is validated.

In yet another example embodiment, the first endpoint 110*a* generates a unique code. When the unique code is input into the second endpoint 110*b* (e.g., by the participant), the account is validated.

In response to validating the second endpoint 110*b*, at 206, the first endpoint 110*a* determines that the second endpoint 110*b* is available for an active session transfer that would include a transfer of context of the multimedia conference session and security related information. As such, the first endpoint 110a tags the second endpoint 110b as an authorized neighbor to be considered for the session transfer. This authorization is particularly important in a crowded office space or outdoor places where many other user devices with conference session capability might be present. Using this secure pairing, the active session is transferred to the second endpoint 110b.

Figure 3:
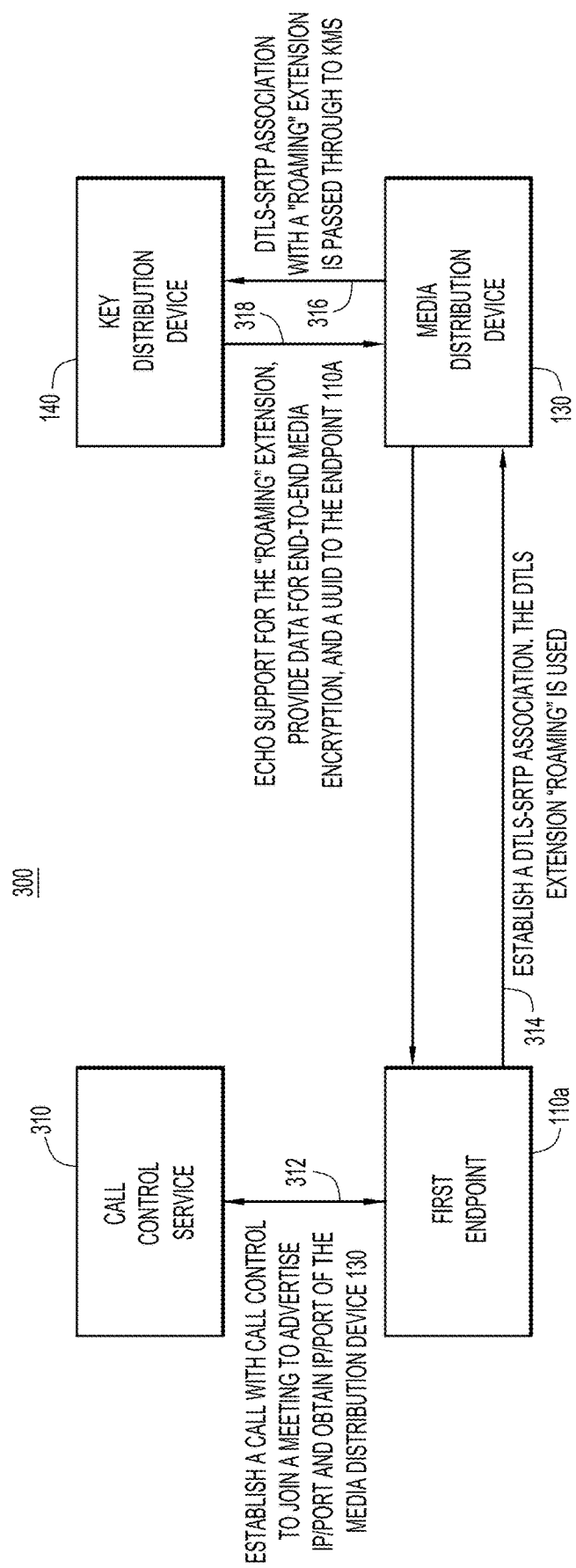
FIG. 3 is an operational flow diagram illustrating a method of connecting the first endpoint device, which is enabled for an active session transfer, to a multimedia conference session, according to an example embodiment.

FIG. 3 is an operational flow diagram illustrating a method 300 of connecting the first endpoint device, which is enabled for an active session transfer, to a multimedia conference session, according to an example embodiment. The method 300 is performed by the first endpoint 110a, the media distribution device 130, the key distribution device 140, of FIG. 1, and a call control service 310.

The call control service 310 manages calls originating from or to the first endpoint 110a including one or more multimedia conference sessions in which the first endpoint 110a is participating. The call control service 310 may include one or more software programs running on one or more hardware servers or in the cloud that manage operations of a network system, of which the first endpoint 110a is a part. The call control service 310 manages and controls the multimedia conference session. In some deployments, the call control service 310 may execute in the same box as the media distribution device 130, as a separate application.

At 312, the first endpoint 110a establishes a call with the call control service 310. The call is established to connect the first endpoint 110a to a multimedia conference session on behalf of the first participant, Alice. The first endpoint 110a advertises its location information, such as an Internet Protocol (IP) address and/or port and requests information about the media distribution device 130. The call control service 310 provides the requested information about the media distribution device 130 including IP address and/or port of the media distribution device 130.

At 314, the first endpoint 110a establishes a DTLS-SRTP association with the media distribution device 130. The DTLS-SRTP includes a new DTLS extension called "roaming". The "roaming" extension indicates that the first endpoint 110a supports transfer of the multimedia conference session to another endpoint. At 316, the DTLS-SRTP association with the "roaming" extension is passed through to the key distribution device 140. According to one variation, the first endpoint 110a (a DTLS client) first establishes a DTLS association with the key distribution device 140, and then advertises support for a DTLS extension called "roaming". In various example embodiments, the first endpoint 110a notifies the key distribution device 140 that it supports transfer of the multimedia conference session to other endpoints by means other than the new "roaming" extension.

At 318, the key distribution device 140, in one or more messages, echoes support for the "roaming" extension, generates and provides security information for the multimedia conference session, and generates and provides a Universally Unique Identifier (UUID). That is, if session transfer is supported by the key distribution device 140 (a DTLS server), the key distribution device 140 includes the UUID as part of the response to the "roaming" extension. The UUID uniquely identifies the first endpoint 110a or the first participant in the multimedia conference session. The security information may include one or more of SRTP master key, SRTP master salt, KEK, and HBH key.

When the DTLS association with the key distribution device 140 is completed, the first endpoint 110a has the information needed to encrypt packets i.e., for end-to-end encryption and hop-by-hop encryption. Additionally, the first endpoint 110a begins learning the SRTP master key associated with each of the other endpoints 120a-n of FIG. 1 in the multimedia conference session.

Figure 4:
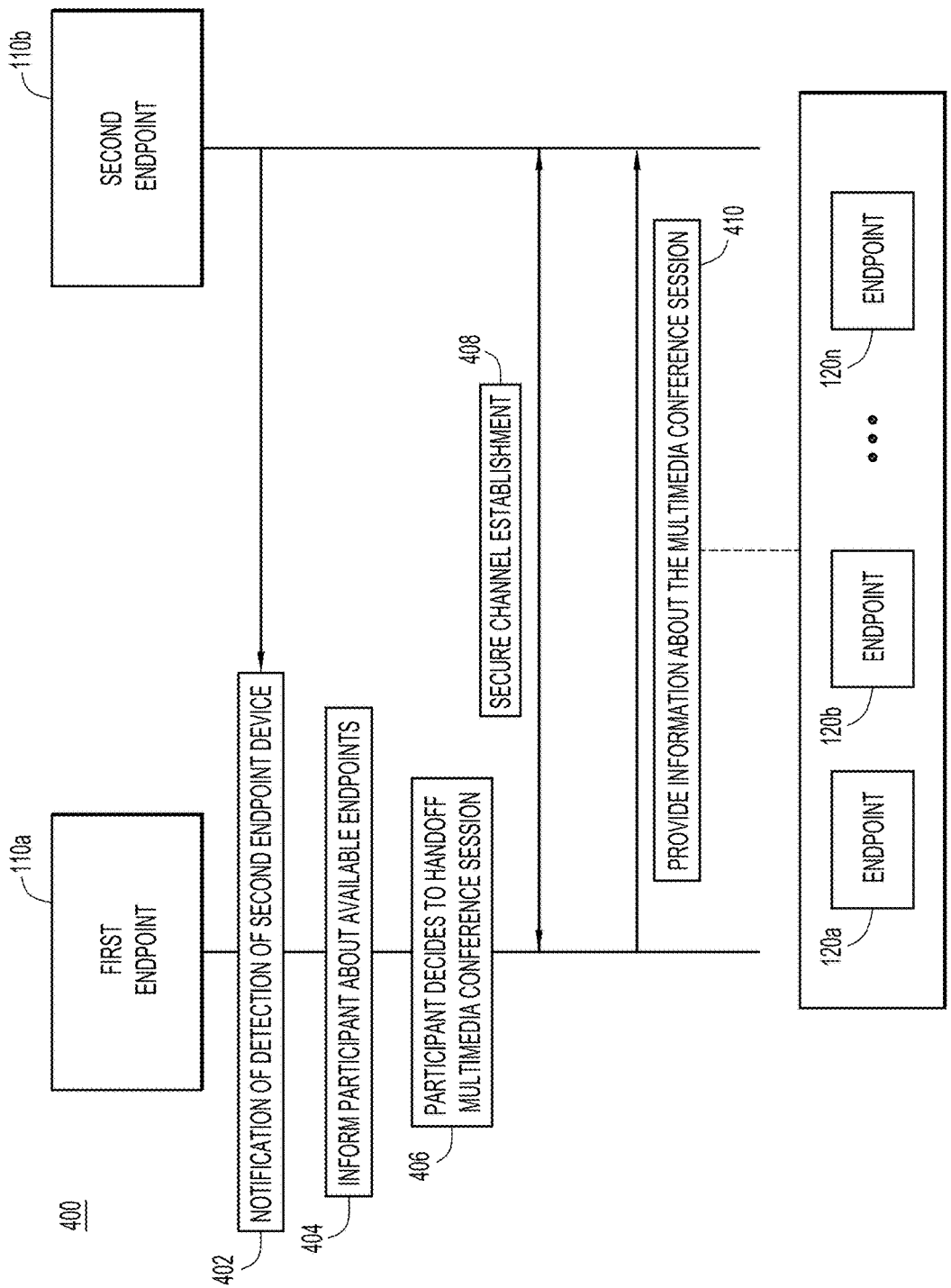
FIG. 4 is a sequence diagram illustrating, in further detail, a process to transfer information about a multimedia conference session from the first endpoint device to the second endpoint device, according to an example embodiment.

FIG. 4 is a sequence diagram 400 illustrating, in further detail, transfer of information about a multimedia conference session from the first endpoint 110a to the second endpoint 110b, of FIG. 1, according to an example embodiment.

While the multimedia conference session is in progress, the meeting application executing on the first endpoint 110a detects other endpoints in close physical proximity that are viable endpoints from which Alice may continue attending the session, as depicted in FIG. 2.

At 402, the first endpoint 110a such as a laptop, obtains a notification indicating that the second endpoint 110b is within a predetermined location proximity of the first endpoint 110a.

Based on detecting presence of other physical endpoints in close physical proximity, at 404, the meeting application executing on the first endpoint 110a introduces a popup or other visual notification that informs the participant about other endpoints to which the multimedia conference session may be transferred.

At 406, a request is obtained from the participant to transfer the meeting to another endpoint. That is, the participant selects the second endpoint 110b such as a mobile device (Smartphone) from the application executing at the first endpoint 110a to handoff the multimedia conference session.

At 408, the first endpoint 110a establishes a secure pairing connection (secure channel) with the second endpoint 110b.

At 410, the first endpoint 110a, via the secure channel, provides information about the multimedia conference session based on which the session is transferred to the second endpoint 110b. The information includes one or more of:
 a. The Local Master Key (such as Local SRTP Master Key) and Master Salt,
 b. The Local SSRC,
 c. The local ROC,
 d. The UUID assigned to the first endpoint 110a during DTLS association,
 e. The KEK,
 f. The HBH key, and
 g. The list of all SSRCs (n SSRCs for n participants) in the multimedia conference session with their most current SRTP Master Key.

In one instance, a given SSRC may have just advertised a new master key to the first endpoint 110a. In this case, the first endpoint 110a communicates both the latest SRTP Master Key (the new master key) and the previous master key to the second endpoint 110b.

The information further includes context of the multimedia conference session including state information and so on. The information about the multimedia conference session is transferred in various formats, such as XML/JSON. Once the information transfer is complete, the second endpoint 110b communicates with the media distribution device 130 to continue the multimedia conference session, replacing the first endpoint 110a, on behalf of the participant Alice.

Figure 5:
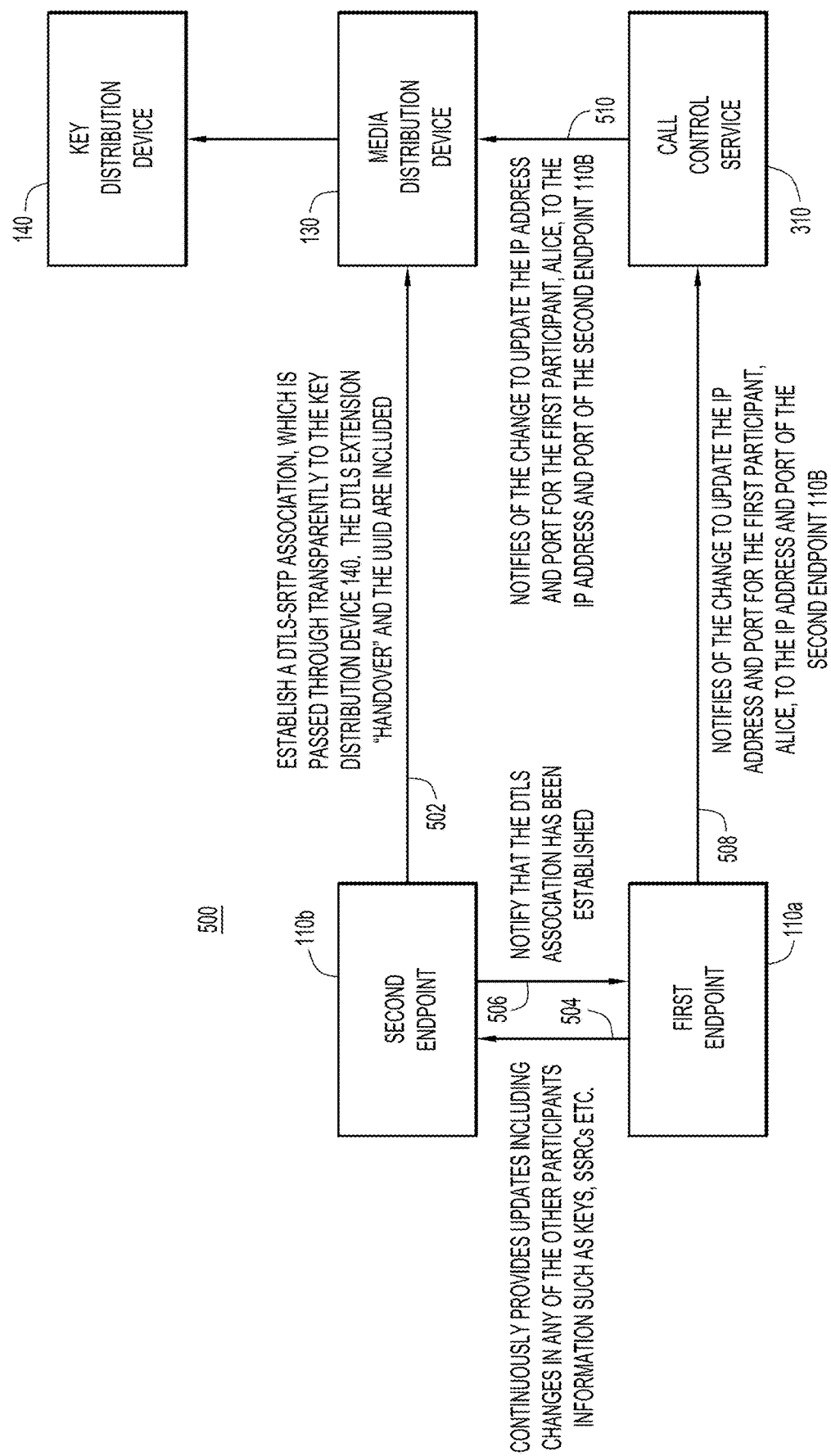
FIG. 5 is an operational flow diagram illustrating, in further detail, the second endpoint device continuing a multimedia conference session to which the first endpoint device had been connected, according to an example embodiment.

FIG. 5 is an operational flow diagram 500 illustrating, in further detail, the second endpoint 110b continuing the multimedia conference session initiated at the first endpoint 110a, according to an example embodiment. The second endpoint 110b obtained information about the multimedia conference session, as described in FIG. 4, and is now ready to perform the handover to continue the multimedia conference session instead of the first endpoint 110a. The second endpoint 110b communicates with the call control service 310, the media distribution device 130, and the key distribution device 140.

Specifically, once the information exchange of FIG. 4 is complete, at 502, the second endpoint 110b establishes a DTLS-SRTP association with the media distribution device 130, which passes it transparently to the key distribution device 140. In one example, the second endpoint 110b may use a new DTLS extension called "handover". The "handover" extension includes the UUID that the key distribution device 140 provided to the first endpoint 110a at 318 of FIG. 3. The presence of the UUID indicates that the meeting handoff is being performed, securely and with the consent from the first endpoint 110a, to the second endpoint 110b. This is only one example, as the second endpoint 110b may provide the UUID to the key distribution device 140 in other ways e.g., as a separate message.

In response to establishing the DTLS-SRTP association, the key distribution device 140 is not required to provide the second endpoint 110b any of the information associated with the multimedia conference session because this information has already been transferred to the second endpoint 110b by the first endpoint 110a. That is, none of the other entities in the multimedia conference session (the call control service 310, the media distribution device 130, and the key distribution device 140) need to provide the context, state, and/or security related information about the multimedia conference session because it was securely provided by the first endpoint 110a with the consent of the first participant, Alice.

It additionally serves as a security mechanism, if for some reason the UUID value was compromised. The key distribution device 140 may not need to provide any of the following security related information:
  a) The SRTP Master Key from which media encryption keys are derived for the security and integrity of protecting RTP packets.
  b) The SRTP master salt, to be used in the key derivation process.
  c) The KEK with which participants in the multimedia conference session use the procedures of Encrypted Key Transport to communicate security related information such the SRTP master key, Roll Over Counter (ROC), SSRC of the sender, among others.
  d) The HBH Key with which an outer cryptographic transform is created for the SRTP packets.

The key distribution device 140 only updates its records with information (such as IP address/port) about the second endpoint 110b but does not need to provide any information about the multimedia conference session to the second endpoint 110b.

While the DTLS-SRTP association is being established, certain aspects of the multimedia conference session may change. For example, the KEK might change (a participant drops out of the multimedia conference session), one of the endpoints 120a-n of FIG. 1 may change its SRTP master key, and so on. In these situations, at 504, the first endpoint 110a continuously provides updates to the second endpoint 110b to ensure that the second endpoint 110b has the most current state of the multimedia conference session.

Once the DTLS-SRTP association has been established between the second endpoint 110b and the key distribution device 140, at 506, the second endpoint 110b provides a notification to the first endpoint 110a indicating that the DTLS-SRTP association has been established and providing its location information such as the IP address and/or port.

At 508, the first endpoint 110a send a notification to the call control service 310 which instructs the call control service 310 to update its record for the first participant, Alice. Specifically, the notification includes the location information (IP address and/or port) of the second endpoint 110b. The call control service 310 updates the information about the first participant to include the new location information of the second endpoint 110b for which the SRTP packets of the multimedia conference session for the first participant, Alice, are now being sourced and received. At 510, the call control service 310 notifies the media distribution device 130 to update its information about the first participant, Alice, with the new location information of the second endpoint 110b.

The handoff is then complete. The first participant, Alice, continues the multimedia conference session using the second endpoint 110b. The second endpoint 110b may then continue to use the same SSRC as the first endpoint 110a. The multimedia conference session need not be re-keyed as the multimedia conference session has been securely transferred from one trusted endpoint (the first endpoint 110a) to another trusted endpoint (the second endpoint 110b) for the same participant.

Figure 6:
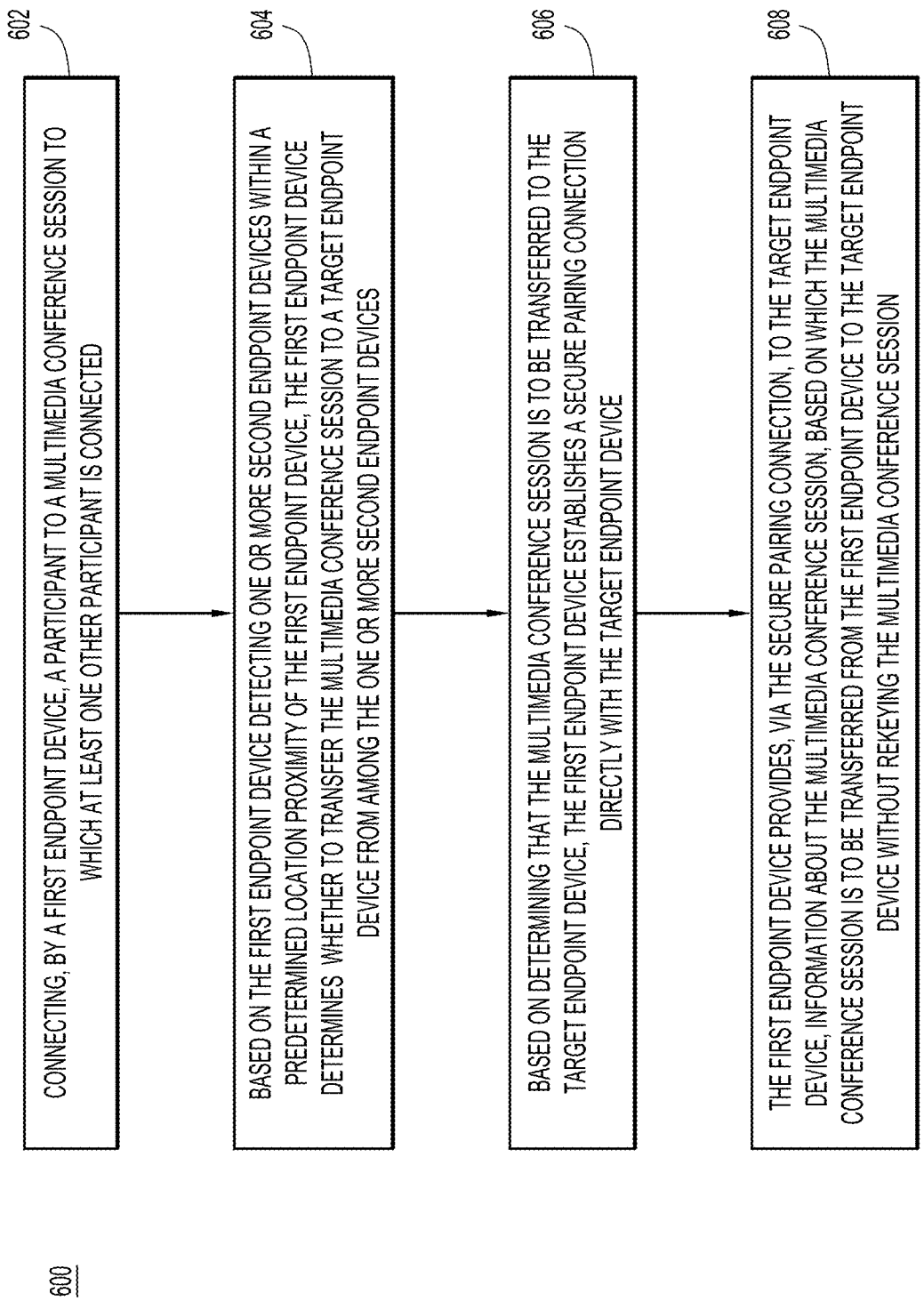
FIG. 6 is a flowchart of a method depicting operations performed by the first endpoint device to facilitate the transfer of a multimedia conference session to the second endpoint device, according to an example embodiment.

FIG. 6 is a flowchart of a method 600 depicting operations performed by a first endpoint device such as the first endpoint 110a of FIGS. 1-5 to facilitate the transfer of a multimedia conference session to a second endpoint device, such as the second endpoint 110b of FIGS. 1-5, according to an example embodiment. The method 600 may be performed by one or more applications executing on the first endpoint 110a.

At 602, the method 600 includes connecting, by a first endpoint device, a participant to a multimedia conference session to which at least one other participant is connected.

At 604, based on the first endpoint device detecting one or more second endpoint devices within a predetermined location proximity of the first endpoint device, the first endpoint device determines whether to transfer the multimedia conference session to a target endpoint device from among the one or more second endpoint devices.

At 606, based on determining that the multimedia conference session is to be transferred to the target endpoint device, the first endpoint device establishes a secure pairing connection directly with the target endpoint device.

At 608, the first endpoint device provides, via the secure pairing connection, to the target endpoint device, information about the multimedia conference session, based on which the multimedia conference session is to be transferred from the first endpoint device to the target endpoint device without rekeying the multimedia conference session.

In one form, the operation 602 may include obtaining, by the first endpoint device from a call control device, a location of a media distribution device for the multimedia conference session and establishing, by the first endpoint device, a security association with the media distribution device using the location. The security association, provided by the media distribution device to a key management device, may include an extension indicating that the first endpoint device supports transfer of the multimedia conference session. The operation 602 may further include obtaining, by the first endpoint device from the key management device, one or more encryption keys for the multimedia conference session and a universally unique identifier associated with the first endpoint device based on the extension.

According to one or more example embodiments, the operation 604 may include detecting, by the first endpoint device, the one or more second endpoint devices that are within the predetermined location proximity to the first endpoint device and obtaining, by the first endpoint device, a selection of the target endpoint device for transferring the multimedia conference session.

The method 600 may further include obtaining, by the first endpoint device, an authorization from the participant, to transfer the multimedia conference session to the target endpoint device.

According to one or more example embodiments, the operation 606 of initiating a secure pairing connection may include enabling secure short-range wireless communication with the target endpoint device.

In one instance, the operation 608 may include providing, by the first endpoint device to the target endpoint device via the secure pairing connection, context of the multimedia conference session that includes state information of the multimedia conference session, a universally unique identifier, and one or more encryption keys used by the first endpoint device in the multimedia conference session to enable transfer, and continuation of, the multimedia conference session on the target endpoint device.

According to one or more example embodiments, the one or more encryption keys may include one or more of a secure real time protocol (SRTP) master key, an SRTP master salt, a key encryption key, a hop-by-hop key, a roll over counter, a synchronization source identifier for each of the at least one other participant in the multimedia conference session. The multimedia conference session may be an end-to-end encrypted and authenticated conferencing session.

The method 600 may further include providing, by the first endpoint device to a call control device, location information of the target endpoint device based on the multimedia conference session being transferred for the participant to the target endpoint device.

In one form, the method 600 may further include providing, by the first endpoint device to the target endpoint device, an update about the multimedia conference session while the multimedia conference session is being transferred to the target endpoint device.

According to one or more example embodiments, the update may include one or more of a change in the at least one other participant of the multimedia conference session and a security information related change.

Figure 7:
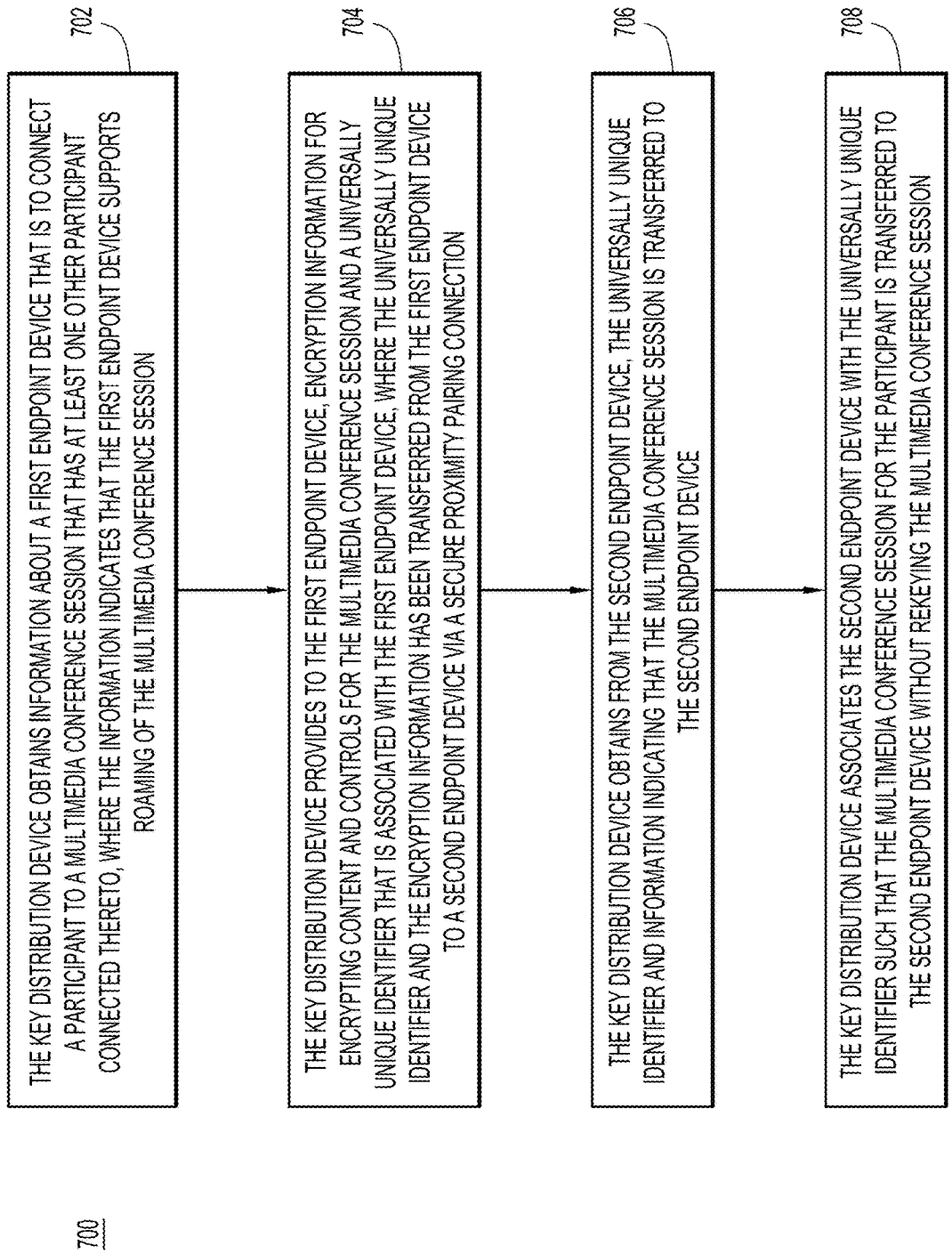
FIG. 7 is a flowchart of a method depicting operations performed by a key distribution device to facilitate the transfer of a multimedia conference session from a first endpoint device to a second endpoint device, according to an example embodiment.

FIG. 7 is a flowchart of a method 700 depicting operations performed by a key distribution device such as the key distribution device shown in FIGS. 1, 3, and 5 to facilitate the transfer of a multimedia conference session, according to an example embodiment. The method 700 may be performed by one or more applications executing on the key distribution device 140.

At 702, the key distribution device obtains information about a first endpoint device that is to connect a participant to a multimedia conference session that has at least one other participant connected thereto. The information indicates that the first endpoint device supports roaming of the multimedia conference session.

At 704, key distribution device provides to the first endpoint device, encryption information for encrypting content and controls for the multimedia conference session and a universally unique identifier that is associated with the first endpoint device. The universally unique identifier and the encryption information has been transferred from the first endpoint device to a second endpoint device via a secure proximity pairing connection.

At 706, the key distribution device obtains from the second endpoint device, the universally unique identifier and information indicating that the multimedia conference session is transferred to the second endpoint device.

At 708, the key distribution device associates the second endpoint device with the universally unique identifier such that the multimedia conference session for the participant is transferred to the second endpoint device without rekeying the multimedia conference session.

In one form, the operation 702 may include establishing, by the key distribution device, a security association with the first endpoint device via a media distribution device and based on establishing the security association, obtaining a roaming extension that indicates that the first endpoint device supports transfer of the multimedia conference session.

According to one or more example embodiments, the method 700 may further include generating, by the key distribution device, the universally unique identifier and a plurality of encryption keys including one or more of a secure real time protocol (SRTP) master key, an SRTP master salt, a key encryption key, a hop-by-hop key, a roll over counter, and a synchronization source identifier for each of the at least one other participant in the multimedia conference session. The multimedia conference session may be an end-to-end encrypted and authenticated conferencing session.

According to one or more example embodiments, the plurality of encryption keys may be transferred from the first endpoint device to the second endpoint device via the secure proximity pairing connection such that the multimedia conference session is continued on the second endpoint device using the plurality of encryption keys.

In one example, the operation 706 may include establishing, by the key distribution device, a security association with the second endpoint device via a media distribution device and based on establishing the security association, obtaining a handover extension that indicates that the multimedia conference session is transferred to the second endpoint device.

Figure 8:
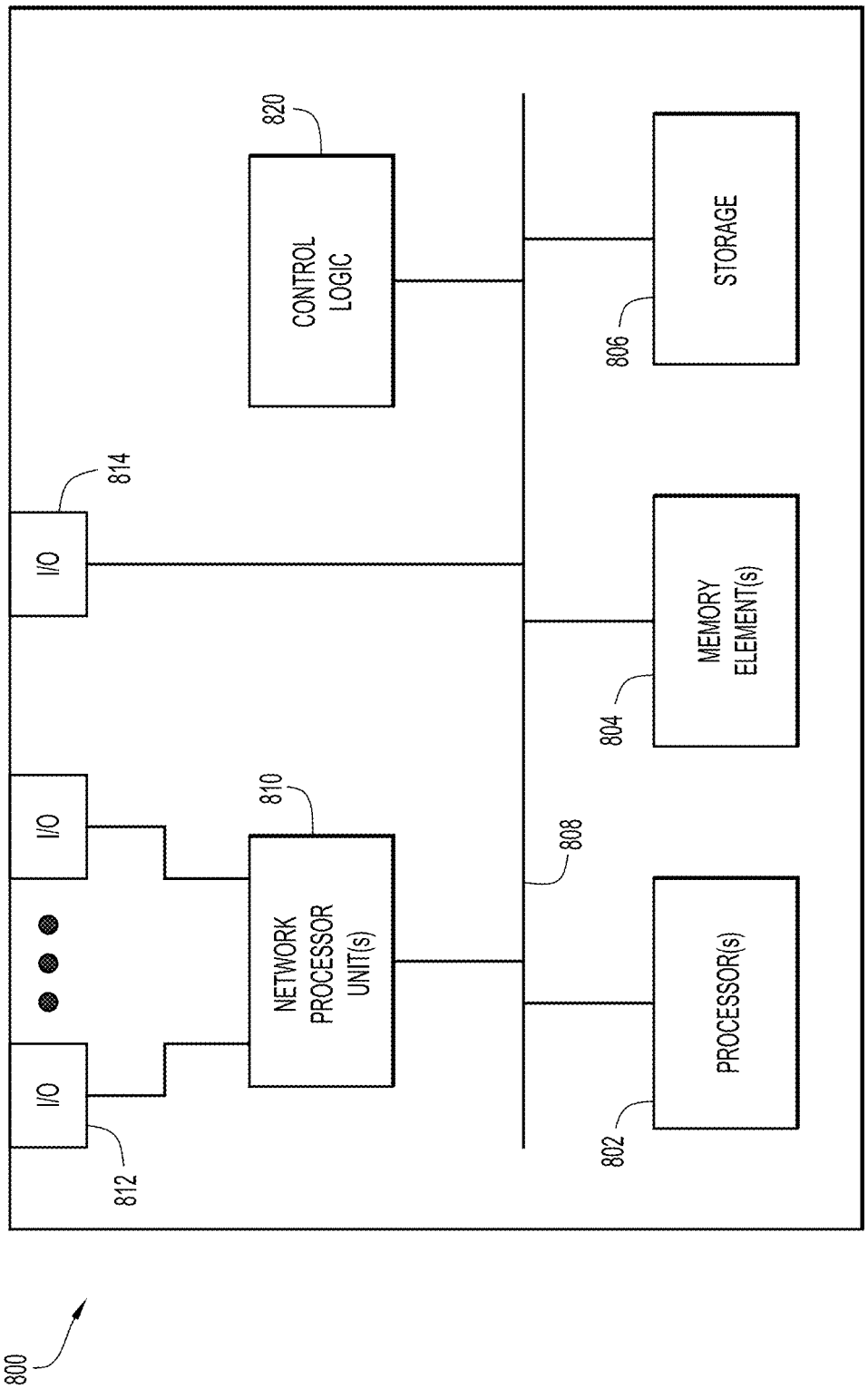
FIG. 8 is a hardware block diagram of a computing device configured to facilitate the transfer of a multimedia conference session from a first endpoint device to a second endpoint device, according to various example embodiments.

FIG. 8 is a hardware block diagram of a computing device 800 configured to facilitate the transfer of a multimedia conference session from a first endpoint device to a second endpoint device, according to various example embodiments.

The computing device 800 may perform the functions of any of the first endpoint 110a, the second endpoint 110b, the media distribution device 130, the key distribution device 140, or the call control service 310 discussed herein in connection with FIGS. 1-7. In one example, the computing device 800 is generally representative of a first endpoint device such as the first endpoint 110a of FIGS. 1-7. In another example, the computing device 800 is generally representative of a key distribution device such as the key distribution device 140 of FIGS. 1, 3, and 5-7.

In at least one embodiment, computing device 800 may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with one or more memory elements 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, and/or any other I/O port(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computer device 800. For example, I/O interface(s) 814 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In still another example embodiment, an apparatus is a first endpoint 110*a* of FIGS. 1-7. The apparatus includes a memory, a network interface configured to enable network communications, and a processor. The processor is configured to perform operations that include connecting a participant to a multimedia conference session to which at least one other participant is connected and based on detecting one or more endpoint devices within a predetermined location proximity of the apparatus, determining whether to transfer the multimedia conference session to a target endpoint device from among the one or more endpoint devices. The operations further include, based on determining that the multimedia conference session is to be transferred to the target endpoint device, establishing a secure pairing connection directly with the target endpoint device and providing, via the secure pairing connection, to the target endpoint device, information about the multimedia conference session based on which the multimedia conference session is to be transferred from the apparatus to the target endpoint device without rekeying the multimedia conference session.

In one form, the processor may be configured to perform the operation of connecting to the multimedia conference session by obtaining, from a call control device, a location of a media distribution device for the multimedia conference session and establishing a security association with the media distribution device using the location. The security association is provided by the media distribution device to a key management device and includes an extension indicating that the apparatus supports transfer of the multimedia conference session. The operation of connecting the multimedia conference session may further include obtaining, from the key management device, one or more encryption keys for the multimedia conference session and a universally unique identifier associated with the apparatus based on the extension.

According to one or more example embodiments, the processor may be configured to perform the operation of determining whether to transfer the multimedia conference session by detecting the one or more endpoint devices that are within the predetermined location proximity to the apparatus and obtaining a selection of the target endpoint device for transferring the multimedia conference session.

In one instance, the processor may further be configured to perform an additional operation including obtaining an authorization from the participant, to transfer the multimedia conference session to the target endpoint device.

According to one or more example embodiments, the processor may be configured to perform the operation of establishing the secure pairing connection by enabling a secure short-range wireless communication with the target endpoint device.

In another example embodiment, one or more non-transitory computer readable storage media encoded with instructions are provided. When the media is executed by a processor, the instructions cause the processor to perform the operations explained above with reference to FIGS. 1-7. In yet another example embodiment, a system is provided that includes the device and operations explained above with reference to FIGS. 1-7.

The programs described herein (e.g., control logic 820) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 806 and/or memory elements(s) 804 can store data, software, code, instructions (e.g., processor instructions), logic, parameters, combinations thereof, and/or the like used for operations described herein. This includes the storage 806 and/or memory elements(s) 804 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer usable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IOT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining, by a key distribution device, information about a first endpoint device that is to connect a participant to a multimedia conference session that has at least one other participant connected thereto, wherein the information indicates that the first endpoint device supports roaming of the multimedia conference session;
   providing, by the key distribution device to the first endpoint device, encryption information for encrypting content and controls for the multimedia conference session and a universally unique identifier that is associated with the first endpoint device, wherein the universally unique identifier and the encryption information has been transferred from the first endpoint device to a second endpoint device via a secure proximity pairing connection;
   obtaining, by the key distribution device from the second endpoint device, the universally unique identifier and transfer information indicating that the multimedia conference session is transferred to the second endpoint device; and
   associating, by the key distribution device, the second endpoint device with the universally unique identifier such that the multimedia conference session for the participant is transferred to the second endpoint device without rekeying the multimedia conference session.

2. The method of claim 1, wherein obtaining the information about the first endpoint device includes:
   establishing, by the key distribution device, a security association with the first endpoint device via a media distribution device; and
   based on establishing the security association, obtaining a roaming extension that indicates that the first endpoint device supports transfer of the multimedia conference session.

3. The method of claim 1, further comprising:
   generating, by the key distribution device, the universally unique identifier and a plurality of encryption keys including one or more of a secure real time protocol (SRTP) master key, an SRTP master salt, a key encryption key, a hop-by-hop key, a roll over counter, and a synchronization source identifier for each of the at least one other participant in the multimedia conference session, wherein the multimedia conference session is an end-to-end encrypted and authenticated conferencing session.

4. The method of claim 3, wherein the plurality of encryption keys are transferred from the first endpoint device to the second endpoint device via the secure proximity pairing connection such that the multimedia conference session is continued on the second endpoint device using the plurality of encryption keys.

5. The method of claim 4, wherein obtaining the universally unique identifier and the information indicating that the multimedia conference session is transferred includes:
   establishing, by the key distribution device, a security association with the second endpoint device via a media distribution device; and
   based on establishing the security association, obtaining a handover extension that indicates that the multimedia conference session is transferred to the second endpoint device.

6. The method of claim 1, further comprising:
   generating, by the key distribution device, the universally unique identifier and a plurality of encryption keys, wherein the multimedia conference session is an endto-end encrypted and authenticated conferencing session that is encrypted using the plurality of encryption keys.

7. The method of claim 6, wherein the plurality of encryption keys are transferred from the first endpoint device to the second endpoint device via the secure proximity pairing connection in which the plurality of encryption keys are encrypted using a short-term key or a symmetric key.

8. The method of claim 7, wherein the multimedia conference session is continued on the second endpoint device using the plurality of encryption keys after the key distribution device associates the second endpoint device with the universally unique identifier.

9. An apparatus comprising:
a memory;
a network interface configured to enable network communications; and
a processor, wherein the processor is configured to perform operations comprising:
obtaining information about a first endpoint device that is to connect a participant to a multimedia conference session that has at least one other participant connected thereto, wherein the information indicates that the first endpoint device supports roaming of the multimedia conference session,
providing, to the first endpoint device, encryption information for encrypting content and controls for the multimedia conference session and a universally unique identifier that is associated with the first endpoint device, wherein the universally unique identifier and the encryption information has been transferred from the first endpoint device to a second endpoint device via a secure proximity pairing connection,
obtaining, from the second endpoint device, the universally unique identifier and transfer information indicating that the multimedia conference session is transferred to the second endpoint device, and
associating the second endpoint device with the universally unique identifier such that the multimedia conference session for the participant is transferred to the second endpoint device without rekeying the multimedia conference session.

10. The apparatus of claim 9, wherein the processor is configured to perform the operation of obtaining the information about the first endpoint device by:
establishing a security association with the first endpoint device via a media distribution device; and
based on establishing the security association, obtaining a roaming extension that indicates that the first endpoint device supports transfer of the multimedia conference session.

11. The apparatus of claim 9, wherein the processor is further configured to perform:
generating the universally unique identifier and a plurality of encryption keys including one or more of a secure real time protocol (SRTP) master key, an SRTP master salt, a key encryption key, a hop-by-hop key, a roll over counter, and a synchronization source identifier for each of the at least one other participant in the multimedia conference session, wherein the multimedia conference session is an end-to-end encrypted and authenticated conferencing session.

12. The apparatus of claim 11, wherein the plurality of encryption keys are transferred from the first endpoint device to the second endpoint device via the secure proximity pairing connection such that the multimedia conference session is continued on the second endpoint device using the plurality of encryption keys.

13. The apparatus of claim 12, wherein the processor is configured to perform the operation of obtaining the universally unique identifier and the information indicating that the multimedia conference session is transferred by:
establishing a security association with the second endpoint device via a media distribution device; and
based on establishing the security association, obtaining a handover extension that indicates that the multimedia conference session is transferred to the second endpoint device.

14. The apparatus of claim 9, wherein the processor is further configured to perform:
generating the universally unique identifier and a plurality of encryption keys, wherein the multimedia conference session is an end-to-end encrypted and authenticated conferencing session that is encrypted using the plurality of encryption keys.

15. The apparatus of claim 14, wherein the plurality of encryption keys are transferred from the first endpoint device to the second endpoint device via the secure proximity pairing connection in which the plurality of encryption keys are encrypted using a short-term key or a symmetric key.

16. The apparatus of claim 15, wherein the multimedia conference session is continued on the second endpoint device using the plurality of encryption keys after the processor associates the second endpoint device with the universally unique identifier.

17. One or more non-transitory computer readable storage media encoded with instructions that, when executed by a processor, cause the processor to execute a method comprising:
obtaining, by a key distribution device, information about a first endpoint device that is to connect a participant to a multimedia conference session that has at least one other participant connected thereto, wherein the information indicates that the first endpoint device supports roaming of the multimedia conference session;
providing, by the key distribution device to the first endpoint device, encryption information for encrypting content and controls for the multimedia conference session and a universally unique identifier that is associated with the first endpoint device, wherein the universally unique identifier and the encryption information has been transferred from the first endpoint device to a second endpoint device via a secure proximity pairing connection;
obtaining, by the key distribution device from the second endpoint device, the universally unique identifier and transfer information indicating that the multimedia conference session is transferred to the second endpoint device; and
associating, by the key distribution device, the second endpoint device with the universally unique identifier such that the multimedia conference session for the participant is transferred to the second endpoint device without rekeying the multimedia conference session.

18. The one or more non-transitory computer readable storage media of claim 17, wherein obtaining the information about the first endpoint device includes:
establishing, by the key distribution device, a security association with the first endpoint device via a media distribution device; and based on establishing the security association, obtaining a roaming extension that indicates that the first endpoint device supports transfer of the multimedia conference session.

19. The one or more non-transitory computer readable storage media of claim 17, wherein the method further comprises:
generating, by the key distribution device, the universally unique identifier and a plurality of encryption keys including one or more of a secure real time protocol (SRTP) master key, an SRTP master salt, a key encryption key, a hop-by-hop key, a roll over counter, and a synchronization source identifier for each of the at least one other participant in the multimedia conference session, wherein the multimedia conference session is an end-to-end encrypted and authenticated conferencing session.

20. The one or more non-transitory computer readable storage media of claim 19, wherein the plurality of encryption keys are transferred from the first endpoint device to the second endpoint device via the secure proximity pairing connection such that the multimedia conference session is continued on the second endpoint device using the plurality of encryption keys.

* * * * *